(12) United States Patent
Bazin et al.

(10) Patent No.: US 10,977,831 B2
(45) Date of Patent: Apr. 13, 2021

(54) CAMERA CALIBRATION METHOD AND APPARATUS BASED ON DEEP LEARNING

(71) Applicant: KOREA ADVANCED INSTITUTE OF SCIENCE AND TECHNOLOGY, Daejeon (KR)

(72) Inventors: Jean-Charles Bazin, Nagold (DE); Oleksandr Bogdan, Daejeon (KR); Viktor Eckstein, Daejeon (KR); Francois Rameau, Daejeon (KR)

(73) Assignee: KOREA ADVANCED INSTITUTE OF SCIENCE AND TECHNOLOGY

( * ) Notice: Subject to any disclaimer, the term of this patent is extended or adjusted under 35 U.S.C. 154(b) by 146 days.

(21) Appl. No.: 16/277,214

(22) Filed: Feb. 15, 2019

(65) Prior Publication Data
US 2020/0043197 A1    Feb. 6, 2020

(30) Foreign Application Priority Data
Aug. 3, 2018  (KR) .................... 10-2018-0090565

(51) Int. Cl.
*G06T 7/80* (2017.01)
*G06N 3/08* (2006.01)
*G06N 3/04* (2006.01)
*G06N 20/20* (2019.01)

(52) U.S. Cl.
CPC ............. *G06T 7/80* (2017.01); *G06N 3/0454* (2013.01); *G06N 3/084* (2013.01); *G06N 20/20* (2019.01); *G06T 2207/20081* (2013.01); *G06T 2207/20084* (2013.01)

(58) Field of Classification Search
CPC ............. G06T 7/80; G06T 2207/20081; G06T 2207/20084; G06N 3/084; G06N 20/20; G06N 3/0454
See application file for complete search history.

(56) References Cited

U.S. PATENT DOCUMENTS

| | | | |
|---|---|---|---|
| 2011/0176710 A1* | 7/2011 | Mattiuzzi | G06T 7/48 382/128 |
| 2017/0127045 A1* | 5/2017 | Lin | H04N 13/246 |
| 2017/0286809 A1* | 10/2017 | Pankanti | G06N 3/084 |
| 2018/0150976 A1* | 5/2018 | Loy | G06K 9/00791 |
| 2018/0182083 A1 | 6/2018 | Natroshvili et al. | |
| 2019/0026956 A1* | 1/2019 | Gausebeck | G06T 7/579 |
| 2019/0164312 A1* | 5/2019 | Sunkavalli | G06N 3/0454 |
| 2019/0354857 A1* | 11/2019 | Sallee | G06N 3/04 |
| 2020/0167943 A1* | 5/2020 | Kim | G06T 7/174 |

(Continued)

OTHER PUBLICATIONS

Kyeong-Im Kim et al., "A Distortion Correction Method of Wide-Angle Camera Images Through the Estimation and Validation of a Camera Model", http://dx/doi.org/10.13067/JKIECS.2013.8.12.1923, Dec. 16, 2013, pp. 1923-1931.

(Continued)

*Primary Examiner* — Ming Y Hon
(74) *Attorney, Agent, or Firm* — Harness, Dickey & Pierce, P.L.C.

(57) ABSTRACT

Disclosed herein is a camera calibration method based on deep learning including acquiring an image captured by a camera and predicting an intrinsic parameter of the camera by applying, to the acquired image, a neural network module trained to predict the intrinsic parameter.

8 Claims, 13 Drawing Sheets

(56) References Cited

U.S. PATENT DOCUMENTS

2020/0234467 A1* 7/2020 Tran ..................... G06T 5/006
2020/0250462 A1* 8/2020 Yang .................... G06K 9/4671

OTHER PUBLICATIONS

Chang No Lee et al., "A Study on Efficient Self-Calibration of a Non-Metric Camera for Close-Range Photogrammetry", http://dx.doi.org/10.7848/ksgpc.2012.30.6-1.511, pp. 511-518.

Yannick Hold-Geoffroy, et al., A Perceptual Measure for Deep Single Image Camera Calibration, Apr. 2018 (10 pages).

* cited by examiner (a)

(b)

(c)

(a)         (b)

(a)  (b)

CAMERA CALIBRATION METHOD AND APPARATUS BASED ON DEEP LEARNING

RELATED APPLICATION

The present application is based upon and claims the benefit of priorities from Korean Patent Application No. 10-2018-0090565 filed on Aug. 3, 2018, the disclosure of which is hereby incorporated by reference herein in its entirety.

BACKGROUND OF THE INVENTION

Technical Field

The present disclosure relates in some aspects to a camera calibration method and apparatus and, more particularly, to a camera calibration method and apparatus based on deep learning, which is capable of automatically performing camera calibration without using calibration targets, lines or vanishing points.

Discussion

The statements in this section merely provide background information related to the present disclosure and do not necessarily constitute prior art.

Camera calibration refers to estimation of intrinsic parameters of a camera, such as focal length or lens distortion. Camera calibration is a basic important operation in various applications for camera motion estimation, three-dimensional (3D) image restoration, image editing, special effects of movie, image distortion correction, etc. Accordingly, camera calibration is used in applications and contexts in various fields, such as robots, autonomous vehicles, unmanned aerial vehicles, entertainment industries such as movies, virtual reality and augmented reality (VR/AR), medicine and video surveillance.

Cameras such as fisheye lens cameras, smartphone clip-on lens cameras, catadioptric cameras and action cameras have internal distortion.

Examples of a technique for correcting such camera distortion in the related art include a manual calibration technique and an automatic calibration technique.

In the manual calibration technique, about 20 to 30 consecutive checkerboard images are acquired and then are processed one by one using specific software. Accordingly, it takes about 30 minutes to an hour even for an experienced user to perform the manual calibration. Therefore, the manual calibration technique is complicated and cumbersome.

In the automatic calibration technique, (1) a calibration object (e.g., a checkerboard, etc.) such as a sphere or a planar target including a special marker is used, (2) a specific structure using parallel lines or vanishing points in a scene is observed, and (3) camera parameters are estimated through camera motion in consecutive images, thereby performing camera calibration. Such an automatic calibration technique has the following problems.

First, it is inconvenient to acquire a specific calibration object.

Second, it is difficult to apply the technique for observing the specific structure in the scene to general scenes such as outdoor photographs, portrait photographs and landscape photographs.

Third, a plurality of images is necessary to estimate camera motion.

SUMMARY OF THE INVENTION

The present embodiments provide a camera calibration method and apparatus based on deep learning, which is capable of automatically performing camera calibration without using calibration targets, lines or vanishing points.

In some embodiments of the present disclosure, a camera calibration method based on deep learning includes acquiring an image captured by a camera and predicting an intrinsic parameter of the camera by applying, to the acquired image, a neural network module trained to predict the intrinsic parameter.

In some embodiments of the present disclosure, a camera calibration apparatus based on deep learning includes an acquisition unit configured to acquire an image captured by a camera and a prediction unit configured to predict an intrinsic parameter of the camera by applying, to the acquired image, a neural network module trained to predict the intrinsic parameter.

According to the present embodiments, it is possible to conveniently and accurately predict intrinsic parameters, by training a neural network using a large-scale learning image generated from one planar image and performing camera calibration using the trained neural network.

The present embodiments are applicable to not only an actual photograph but also a distorted image.

In addition, according to the present embodiments, it is possible to stably predict intrinsic parameters with respect to various types of images.

In addition, the present embodiments are applicable to calibration of a wide field of view camera but also calibration of a perspective camera which is not influenced by geometrical distortion.

In addition, according to the present embodiment, it is possible to perform robust camera calibration with respect to a motion blur phenomenon.

DESCRIPTION OF THE PREFERRED EMBODIMENTS

Figure 1:
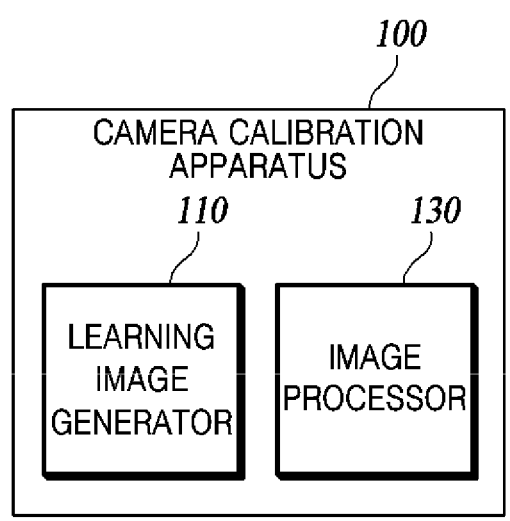
FIG. 1 is a block diagram showing the configuration of a camera calibration apparatus according to the present embodiment.

Hereinafter, at least one embodiment of the present disclosure will be described in detail with reference to the accompanying drawings. It is noted that reference numerals are used to designate identical or similar elements throughout the several views. In describing the present invention, if it is determined that the detailed description of a related known function or construction renders the scope of the present invention unnecessarily ambiguous, the detailed description thereof will be omitted.

It will be understood that, although the terms first, second, A, B, (a), (b), etc. may be used herein to describe various elements of the present invention, these terms are only used to distinguish one element from another element, and order and sequence of corresponding elements are not limited by these terms. In the entire specification, when a certain portion "includes" a certain component, this indicates that the other components are not excluded, but may be further included unless specially described. The terms "unit", "-or/er" and "module" described in the specification indicate a unit for processing at least one function or operation, which may be implemented by hardware, software or a combination thereof.

Hereinafter, the embodiments of the present disclosure will be described in detail with reference to the drawings.

Figure 2:
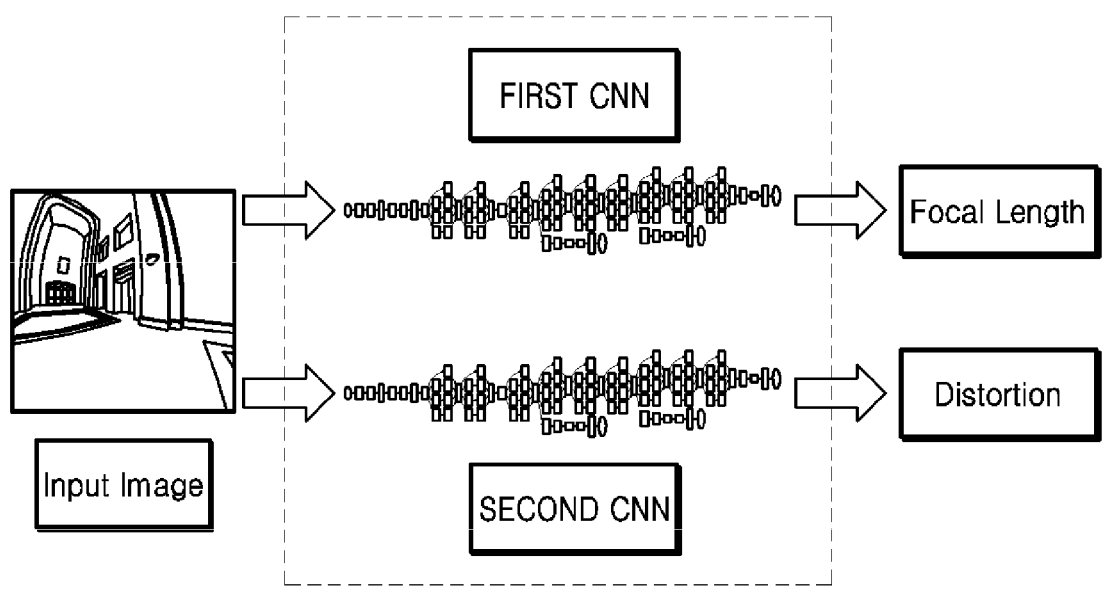
FIG. 2 is a view showing the structure of a CNN module according to the present embodiment.

FIG. 1 is a block diagram showing the configuration of a camera calibration apparatus 100 according to the present embodiment, and FIG. 2 is a view showing the structure of a CNN module according to the present embodiment.

First, referring to FIG. 1, the camera calibration apparatus 100 according to the present invention may include a learning image generator 110 and an image processor 130.

Learning Image Generator 110

The learning image generator 110 may acquire a plurality of images to be used as the learning images of deep learning from one planar image using a 3D geometry mapping algorithm. According to an aspect of the present embodiment, the planar image may be a panoramic planar image of 360 degrees in the horizontal direction and 360 degrees in the vertical direction.

In order to improve accuracy of camera calibration based on deep learning, it is necessary to train a neural network using a large-scale learning image. However, since it takes considerable time, effort and cost to acquire the large-scale learning image, it is difficult to acquire the large-scale learning image. Accordingly, the present embodiment provides a method of acquiring a large-scale learning image from one panoramic planar image using a 3D geometry mapping algorithm.

Meanwhile, deep learning refers to a deep neural network algorithm for modeling the behavioral structure of a human brain. Deep learning may include a convolutional neural network (CNN), a recurrent neural network (RNN), a restricted Boltzmann machine (RBM), etc.

Image Processor 130

The image processor 130 may train a neural network module using a plurality of images generated by the learning image generator 110 and perform camera calibration with respect to an input image using the neural network module without the input image (original image) and advance information (e.g., a degree of distortion of an image, a focal length of a camera, etc.) of a camera for capturing the input image. At this time, the principle point of the input image may be located on the center of the input image.

The neural network module according to the present embodiment may be composed of n neural networks (that is, first to n-th neural networks) trained to output individual intrinsic parameters. Here, n is an integer equal to or greater than 1 and is proportional to the number of classes of the intrinsic parameters for camera calibration.

The structure of the neural network module according to the present embodiment is shown in FIG. 2. FIG. 2 shows the neural network module composed of two CNNs. A first CNN outputs the focal length of the camera and the second CNN outputs a distortion coefficient. The neural network module according to the present embodiment may include one or more neural networks for outputting individual intrinsic parameters, unlike an existing neural network module configured such that one neural network outputs a plurality of intrinsic parameters.

Hereinafter, assume that the neural network module include two CNNs. However, it should be noted that this is merely an example and does not limit the present embodiment.

Figure 3:
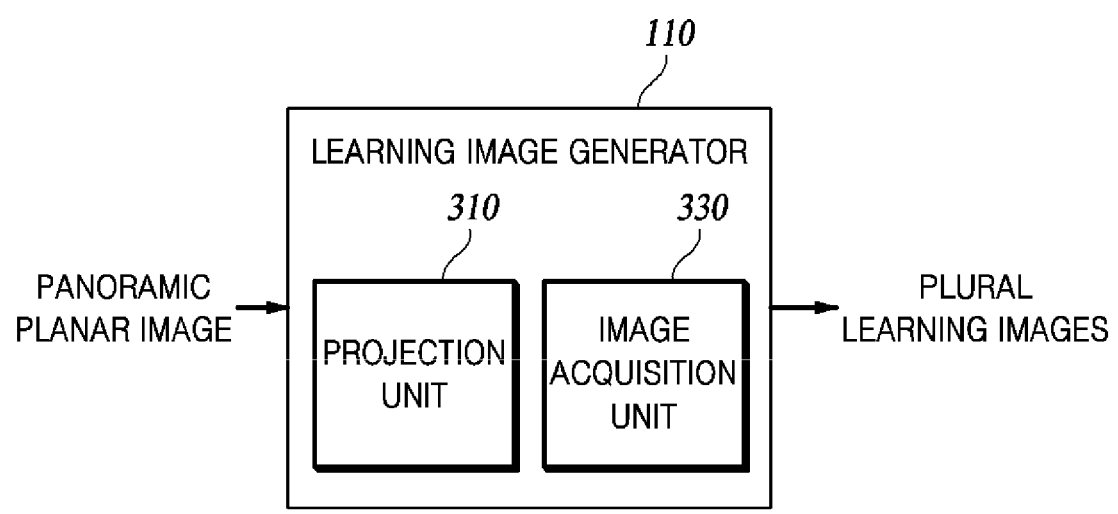
FIG. 3 is a block diagram showing the configuration of a learning image generator according to the present embodiment.
Figure 4:
FIG. 4 is a view showing an input/output image of the learning image generator of FIG. 3.
Figure 4:
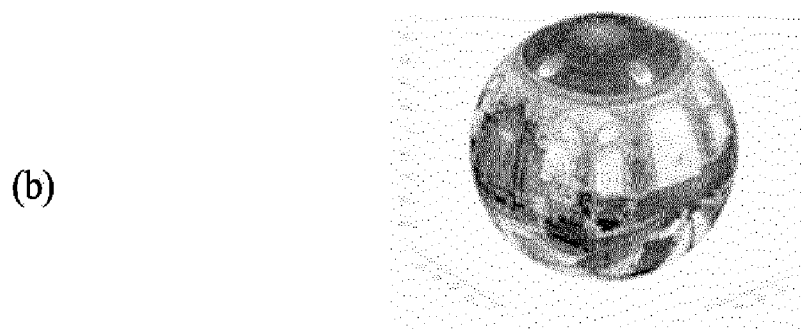
Figure 4:
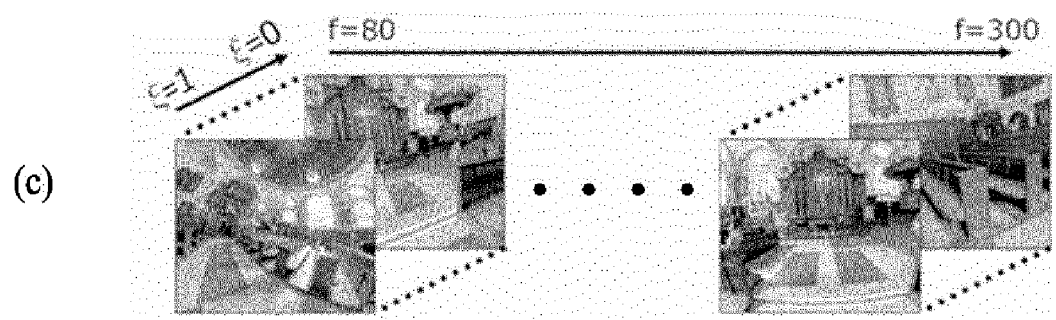
Figure 5:
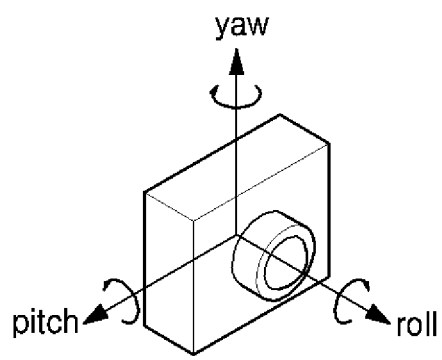
FIG. 5 is a view showing a pitch angle, a roll angle and a yaw angle for changing the orientation of a camera.

FIG. 3 is a block diagram showing the configuration of a learning image generator 110 according to the present embodiment, FIG. 4 is a view showing an input/output image of the learning image generator 110 of FIG. 3, and FIG. 5 is a view showing a pitch angle, a roll angle and a yaw angle for changing the orientation of a camera.

First, referring to FIG. 3, the learning image generator 110 according to the present embodiment may include a projection unit 310 and an image acquisition unit 330.

Projection Unit 310

The projection unit 310 receives a panoramic planar image (that is, rectangular image of 360 degrees in the horizontal direction and 360 degrees in the vertical direction) and projects the panoramic planar image onto 3D geometry, thereby reconstructing a 360-degree 3D image.

For example, the projection unit 310 may divide the received panoramic planar image into a plurality of rectangular regions. At this time, the plurality of rectangular regions may be mapped to different regions of the 3D geometry surface. An example of the panoramic planar image input to the projection unit 310 is shown in (a) of FIG. 4.

In addition, the projection unit 310 may project the rectangular images generated by dividing the panoramic planar image onto the corresponding regions of the 3D geometry surface, thereby generating a 3D image. Here, the 3D geometry is a 3D figure and may include a sphere, a cylinder, a dome, a platonic solid, etc. An example of the 360-degree 3D image generated by the projection process is shown in (b) of FIG. 4. Hereinafter, in the present specification, assume that the 3D geometry is a sphere. However, it should be noted that this is merely for convenience of description and does not limit the present embodiment.

Image Acquisition Unit 330

The image acquisition unit 330 may acquire a plurality of learning images from the 360-degree 3D images generated from the panoramic planar image.

For example, the image acquisition unit 330 may position a virtual camera (hereinafter referred to as a virtual camera) on the center of the 3D geometry and then acquire the plurality of learning images while changing the orientation of the virtual camera. At this time, the orientation of the virtual camera may be changed according to the pitch angle, roll angle and yaw angle of the virtual camera as shown in FIG. 5. In FIG. 5, the pitch angle means the x-axis rotation angle (that is, tilt value) of the camera, the roll angle means the y-axis rotation angle (that is, rotation value), and the yaw angle means the z-axis rotation angle (that is, horizontal pan value).

In addition, the image acquisition unit 330 may acquire the plurality of learning images by adjusting the intrinsic parameters of the virtual camera. Here, the intrinsic parameters to be changed in order to acquire the plurality of images may include a focal length f and a distortion coefficient $\zeta$. An example of the plurality of images acquired while changing the focal length and distortion coefficient of the virtual camera is shown in (c) of FIG. 4. Specifically, the images shown in (c) of FIG. 4 are acquired by adjusting the focal length f of the virtual camera in a range from 80 mm to 300 mm and the distortion coefficient $\zeta$ of the virtual camera in a range from 0 to 1 (that is, a barrel distortion range). For reference, barrel distortion refers to a distortion phenomenon wherein the edge portion of the photographed image is bent outward and mainly occurs in a wide-angle lens or a zoom lens having a large difference in focal length (e.g., a lens of 18 to 200 mm). In addition, as the absolute value of the distortion coefficient increases (that is, as the distortion coefficient $\zeta$ approaches 1 in (c) of FIG. 4), the degree of distortion proportionally increases.

The images acquired from the 360-degree 3D image using the virtual camera are distorted images and have ground truth parameters (the focal length f and the distortion coefficient $\zeta$) used as a reference value for camera calibration. In addition, the plurality of images may be used as the learning image of the neural network module.

Figure 6:
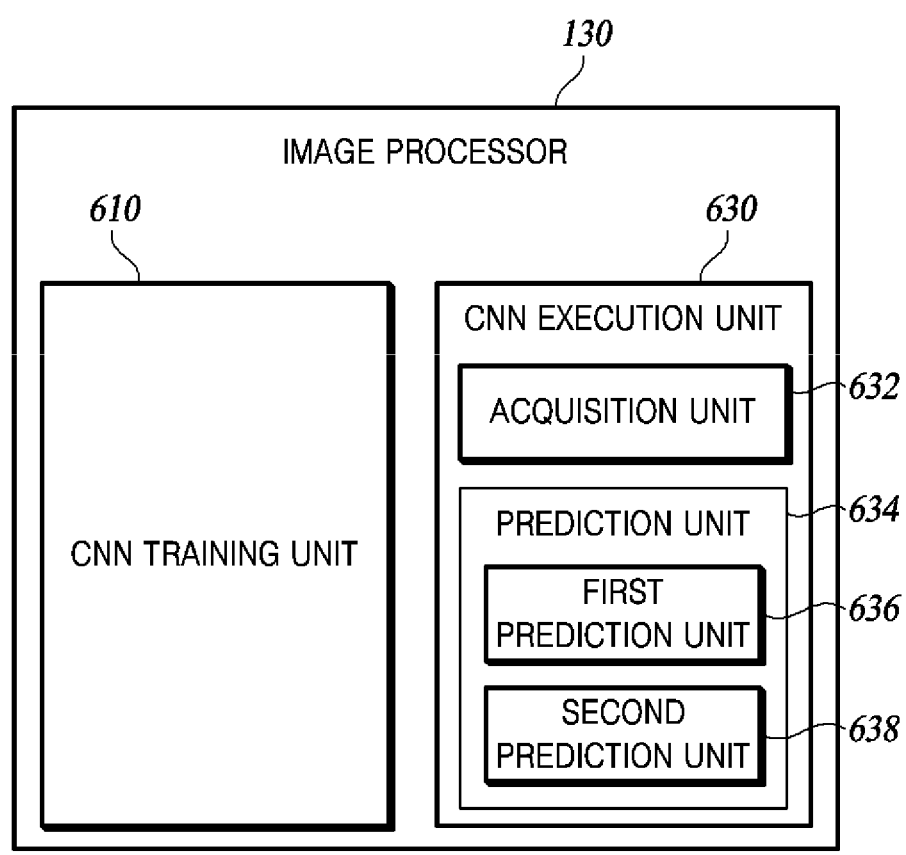
FIG. 6 is a view showing an image processor based on deep learning according to the present embodiment.
Figure 7:
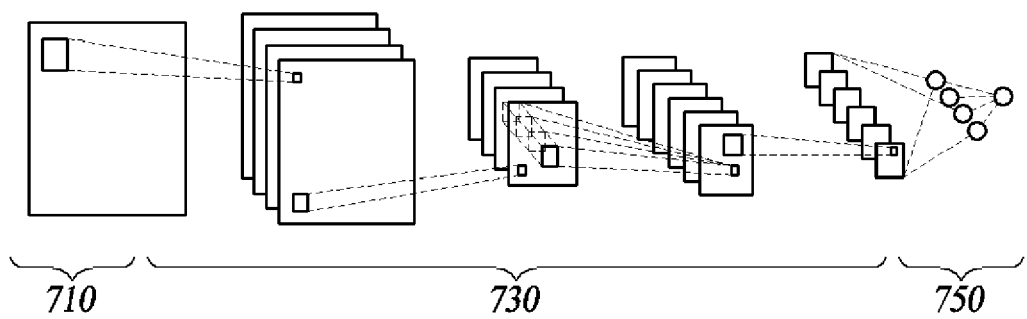
FIG. 7 is a view showing a CNN structure, to which technologies of the present disclosure are applicable.
Figure 8:
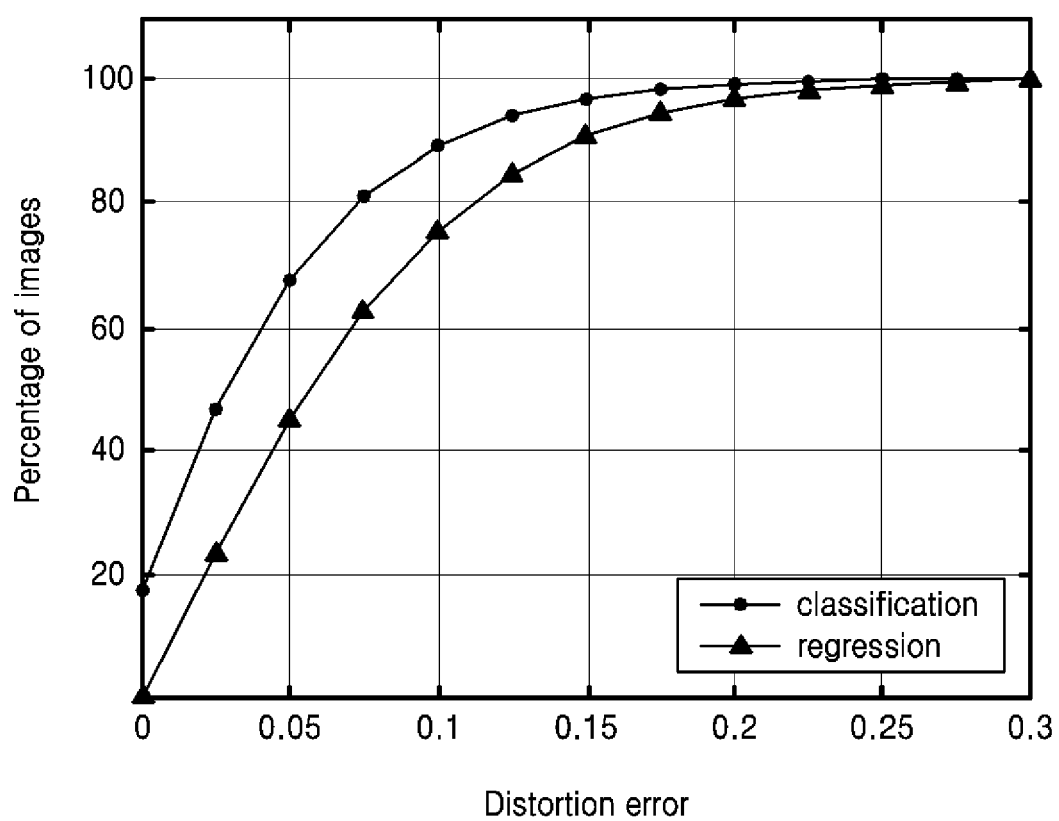
FIG. 8 is a graph showing a simulation result of comparing a classification model with a regression model in terms of prediction accuracy of intrinsic parameters of a camera.

FIG. 6 is a view showing an image processor 130 based on deep learning according to the present embodiment, FIG. 7 is a view showing a CNN structure, to which technologies of the present disclosure are applicable, and FIG. 8 is a graph showing a simulation result of comparing a classification model with a regression model in terms of prediction accuracy of intrinsic parameters of a camera.

First, referring to FIG. 6, the image processor 130 according to the present embodiment may include a CNN training unit 610 and a CNN execution unit 630.

CNN Training Unit 610

The CNN training unit 610 may train the CNN module based on the plurality of learning images acquired from the panoramic planar image.

Specifically, the CNN training unit 610 may train the first CNN to output the focal length parameter of the camera using the plurality of learning images. The CNN training unit 610 may learn the second CNN to output the distortion coefficient parameter of the camera using the plurality of learning images. At this time, the learning image of the first CNN and the learning image of the second CNN are image data generated by the learning image generator 110 described with reference to FIG. 2 and may be equal to each other. The CNN training unit 610 may use an error back propagation algorithm in order to train the first CNN and the second CNN.

An example of the CNN structure, to which the technologies of the present disclosure is applicable, is shown in FIG. 7. Referring to FIG. 7, the CNN may include an input layer 710, a hidden layer 730 and an output layer 750.

The input layer 710 receives image data.

The hidden layer 730 may include one or more convolution layers and a pooling layer. The hidden layer 730 may generate a feature map in which various features of the input image are represented, by repeatedly performing the convolution operation and the sub-sampling operation with respect to the image input to the configured layer. At this time, the weight matrix of a convolution filter used for the convolution operation may be calculated in advance through a learning process using a learning image having an already known label.

The output layer 750 may generate predetermined output data by combining various features represented in the feature map generated by the convolution layer. At this time, the output layer 750 may be composed of one or more fully connected layers. According to an aspect of the present embodiment, the last fully connected layer of the output layer 730 may be composed of a classification layer for predicting and outputting a probability of a similarity between desired output data (that is, ground truth) and actual output data.

For reference, a comparison between the classification model and the regression model in terms of prediction accuracy of a parameter for correcting camera distortion (hereinafter referred to as a distortion parameter) is shown in FIG. 8. In the graph of FIG. 8, the abscissa axis represents a distortion error and the ordinate axis represents the percentage of images. Here, the distortion error means a difference between the predicted distortion parameter and the ground truth value.

In the simulation of FIG. 8, the intrinsic parameters of about 22,000 images were predicted using the classification model and the regression model and the percentages of the images according to the distortion error were calculated. In addition, the classification model and the regression model were learned using an Adam optimizer the same number of times, the classification model used a cross entropy loss function, and the regression model used a log-cosh loss function.

Referring to FIG. 8, it can be seen that the case of using a classification model has a higher percentage of the images having small distortion errors than the case of using the regression model. Specifically, if the distortion error is 0.1, the percentage of the images according to the classification model is about 90%, but the percentage of the images according to the regression model is equal to or less than 80%. From the simulation results of FIG. 8, it can be seen that, the case of using the classification model has higher prediction accuracy of the intrinsic parameter for camera calibration than the case of using the regression model.

CNN Execution Unit 630

Returning to FIG. 6, the CNN execution unit 630 may extract the feature data of the camera image and stochastically predict and generate the intrinsic parameters based on the extracted feature data, by executing the CNN module using the camera image as input data. The CNN execution unit 630 may include an acquisition unit 632 for acquiring an image captured by the camera and a prediction unit 634 for predicting an intrinsic parameter of the camera by applying a neural network module (a CNN module) to the acquired image.

The CNN execution unit 630 may generate the focal length parameter for camera calibration from the input camera image, by executing the first CNN. In addition, the CNN execution unit 630 may generate the distortion coefficient parameter for camera calibration from the input camera image, by executing the second CNN.

The CNN execution unit 630 may execute the first CNN and the second CNN in parallel or sequentially in order to generate the intrinsic parameter for camera calibration. According to an aspect of the present embodiment, if the first CNN and the second CNN are sequentially executed, the CNN execution unit 630 may concatenate at least one map composed of the output data (that is, the focal length parameter) of the first CNN with any one layer, for example, the last fully connected layer, of the second CNN and then execute the second CNN, thereby generating the distortion coefficient parameter.

For this, the prediction unit 634 may include a first prediction unit 636 and a second prediction unit 638. The first prediction unit 636 applies the first CNN to the acquired image to predict the first intrinsic parameter of the camera and the second prediction unit 638 concatenates one or more feature maps composed of the first intrinsic parameter with any one of the fully connected layers of the second CNN and applies the second CNN to the acquired image to predict the second intrinsic parameter of the camera.

Hereinafter, a process of (1) generating a large-scale learning image to train the CNN and (2) performing camera calibration based on the trained CNN at the camera calibration apparatus 100 according to the present embodiment will be described with reference to FIGS. 9 and 10.

Figure 9:
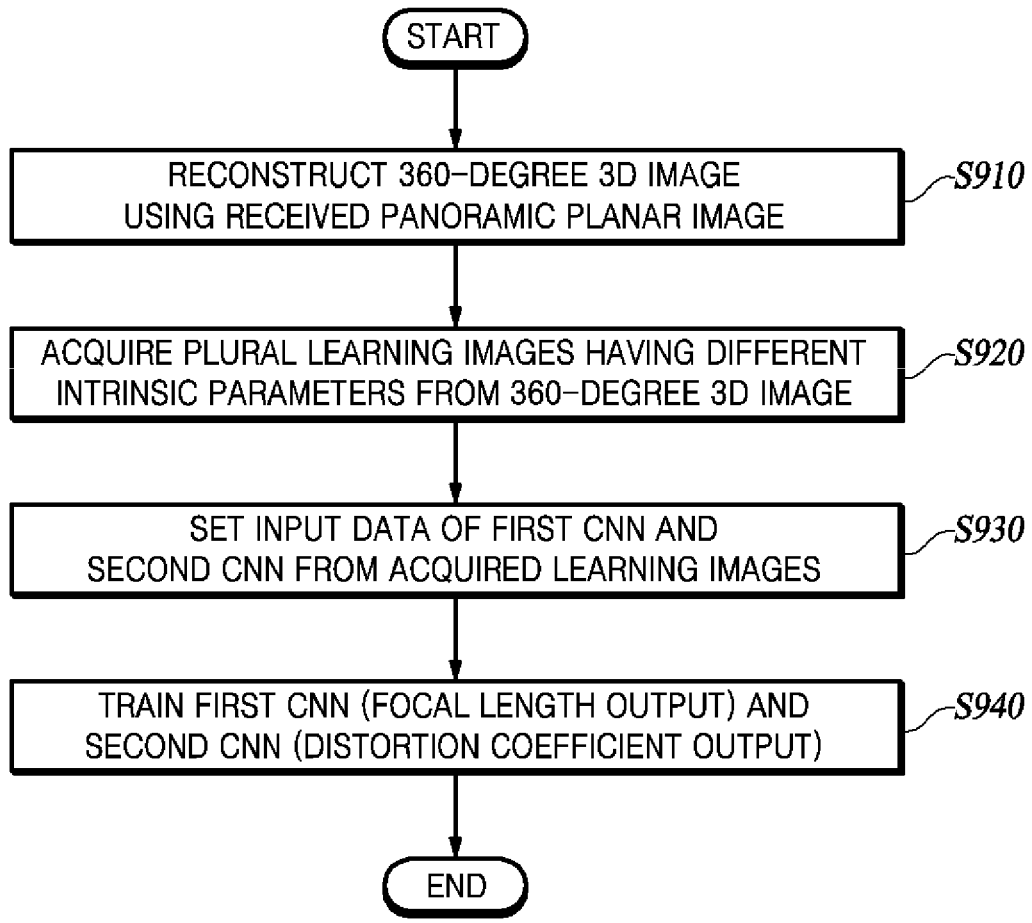
FIG. 9 is a flowchart illustrating an example of a process of performing camera calibration based on a CNN at an image processor according to the present embodiment.

FIG. 9 is a flowchart illustrating an example of a process of generating large-scale learning image to train a CNN at the camera calibration apparatus 100 according to the present embodiment.

Referring to FIGS. 1 and 9, in step S910, the learning image generator 110 may receive a panoramic planar image (that is, a rectangular image of 360 degrees in the horizontal direction and 360 degrees in the vertical direction) and project the panoramic planar image onto 3D geometry, thereby reconstructing a 360-degree 3D image.

Specifically, the learning image generator 110 may project the rectangular images generated by dividing the received panoramic planar image onto the corresponding regions of the 3D geometry surface, thereby generating a 3D image. Here, the 3D geometry is a 3D figure and may include a sphere, a cylinder, a dome, a platonic solid, etc.

In step S920, the learning image generator 110 may acquire a plurality of learning images from the 360-degree images generated from the panoramic planar image.

Specifically, the learning image generator 110 may position a virtual camera (hereinafter referred to as a virtual camera) on the center of the 3D geometry and then acquire the plurality of learning images while changing the orientation of the virtual camera.

In addition, the learning image generator 110 may acquire the plurality of learning images by adjusting the intrinsic parameters of the virtual camera, for example, the focal length and the distortion coefficient.

The plurality of images acquired from the 360-degree 3D image using the virtual camera is distorted images and has ground truth parameters used as a reference value for camera calibration. In addition, the plurality of images may be used as the learning image of the neural network module.

In step S930, the image processor 130 may set image data (input data) to be input to the two CNNs (the first CNN and the second CNN). According to an aspect of the present embodiment, the image data input to the two CNNs may be the plurality of learning images acquired from one panoramic planar image by the learning image generator 110 and may be equal to each other.

In step S940, the image processor 130 may train the first CNN to output the focal length parameter of the camera through the output layer of the first CNN using the input data set in step S930.

In addition, the image processor 130 may train the second CNN to output the distortion coefficient parameter of the camera through the output layer of the second CNN using the input data set in step S930. At this time, the training process of the first CNN and the second CNN may be performed using the back propagation algorithm.

The present embodiment is characterized in that the CNN module is configured to separately output the focal length parameter and the distortion coefficient parameter of the camera through the respective output layers of two CNNs.

Figure 10:
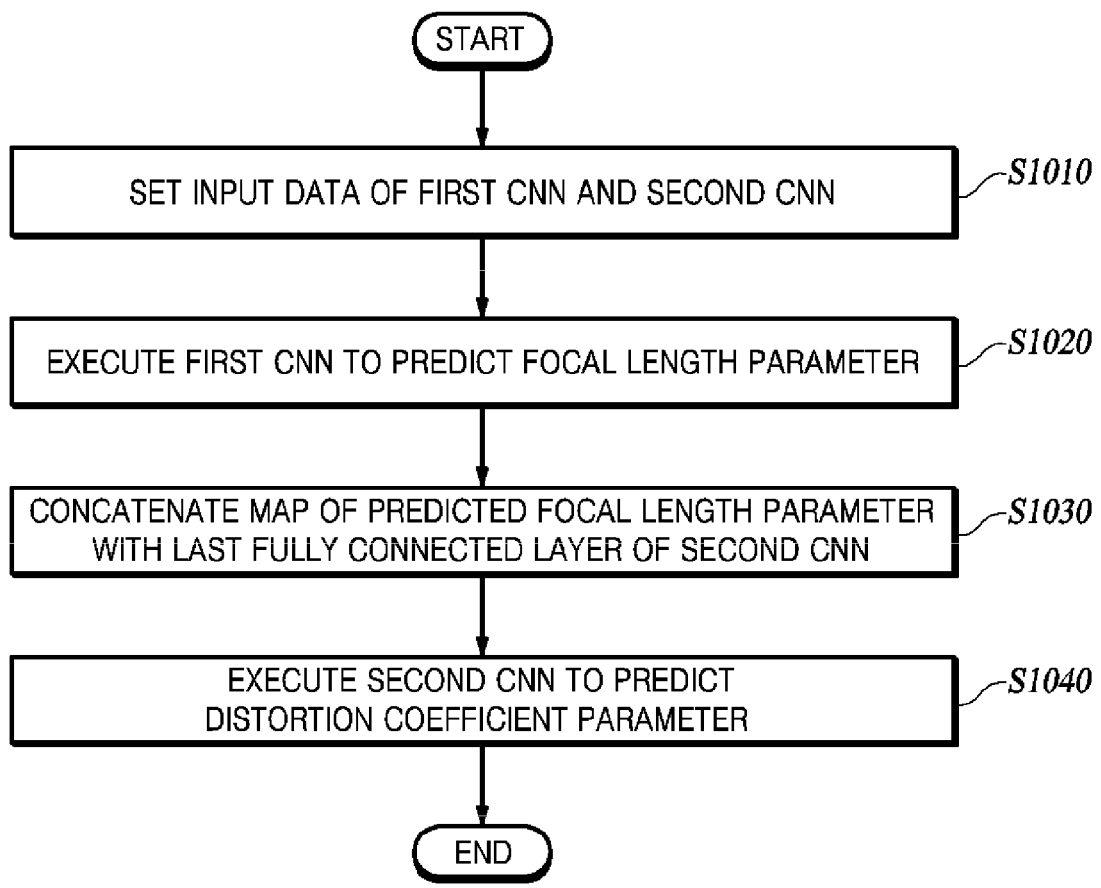
FIG. 10 is a flowchart illustrating an example of a process of performing camera calibration based on a CNN at an image processor according to the present embodiment.

FIG. 10 is a flowchart illustrating an example of a process of performing camera calibration based on a CNN at an image processor 130 according to the present embodiment.

Referring to FIGS. 1 and 10, in step S1010, the image processor 130 may set image data (that is, input data) to be input to the two trained CNNs (that is, the first CNN and the second CNN). At this time, the input data is distorted image data captured by the camera to be subjected to camera calibration and may be equal to each other.

In step S1020, the image processor 130 may generate (or predict) the focal length parameter for camera calibration, by executing the first CNN to perform a reasoning process.

In step S1030, the image processor 130 may concatenate one or more maps composed of the focal length parameter generated in step S1020 with the last fully connected layer of the second CNN.

In step S1040, the image processor 130 may generate (or predict) the distortion coefficient parameter for camera calibration, by executing the second CNN to perform a reasoning process.

Although a plurality of steps is described as being sequentially performed in FIGS. 9 and 10, this is merely illustrative of the technical idea of the present embodiment. In other words, it will be understood by those skilled in the art that various modifications and changes may be made by changing the order described in FIGS. 9 and 10 or performing some of the plurality of steps in parallel without departing from the spirit and scope of the embodiment. Therefore, FIGS. 9 and 10 are not limited to the time-series order.

The process shown in FIGS. 9 and 10 can also be embodied as computer readable code on a computer readable recording medium. The computer readable recording medium is any data storage device that can store data which can thereafter be read by a computer system. Examples of the computer readable recording medium include a magnetic storage medium (e.g., read-only memory (ROM), floppy disk, hard disk, etc.), an optical reading medium (e.g. CD-ROM, DVD, etc.), and carrier waves (such as data transmission through the Internet). The computer readable recording medium can also be distributed over network coupled computer systems so that the computer readable code is stored and executed in a distributed fashion.

Figure 11:
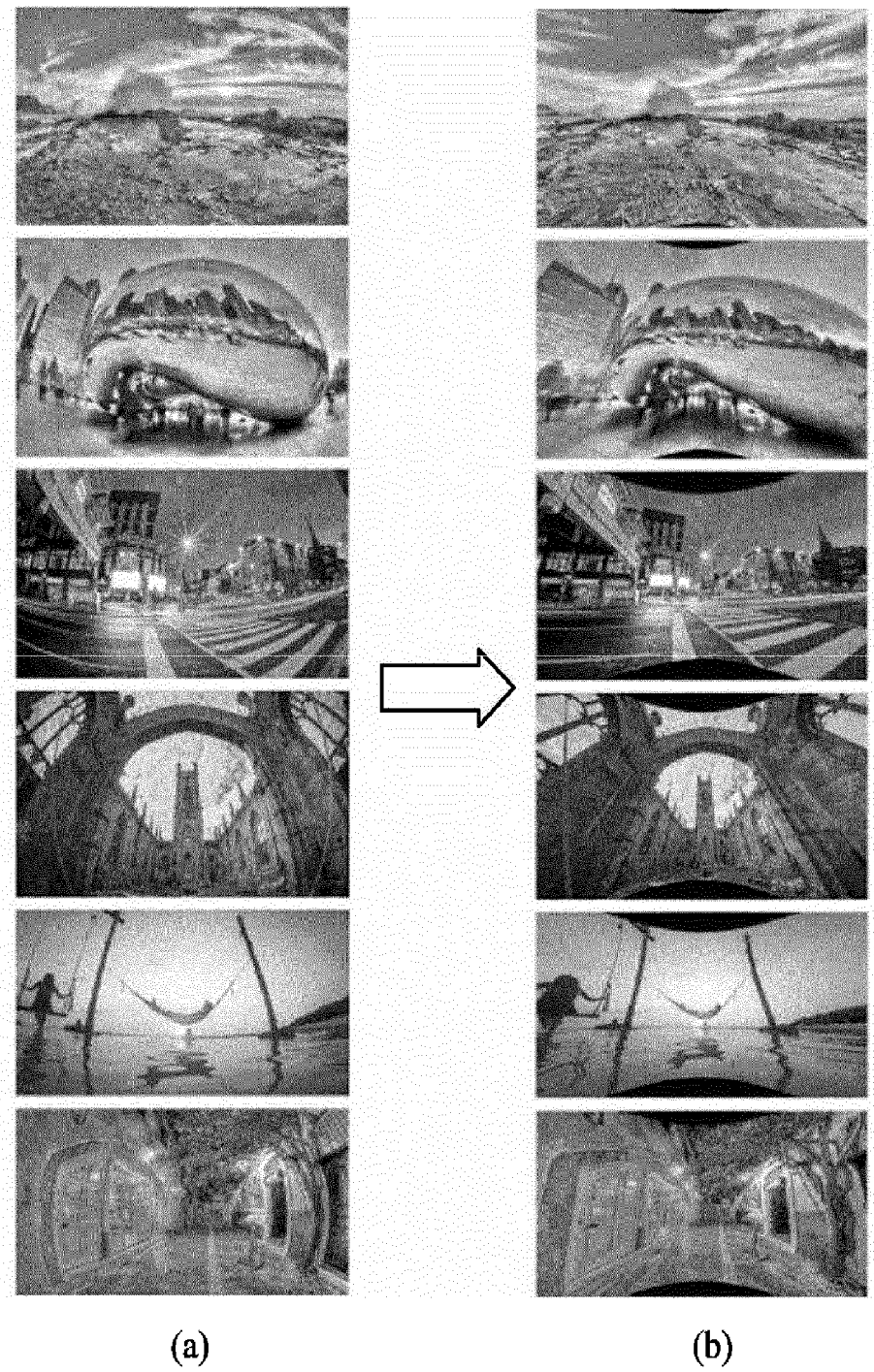
FIGS. 11 to 13 are views showing images as results of performing camera calibration according to the present embodiment.
Figure 12:
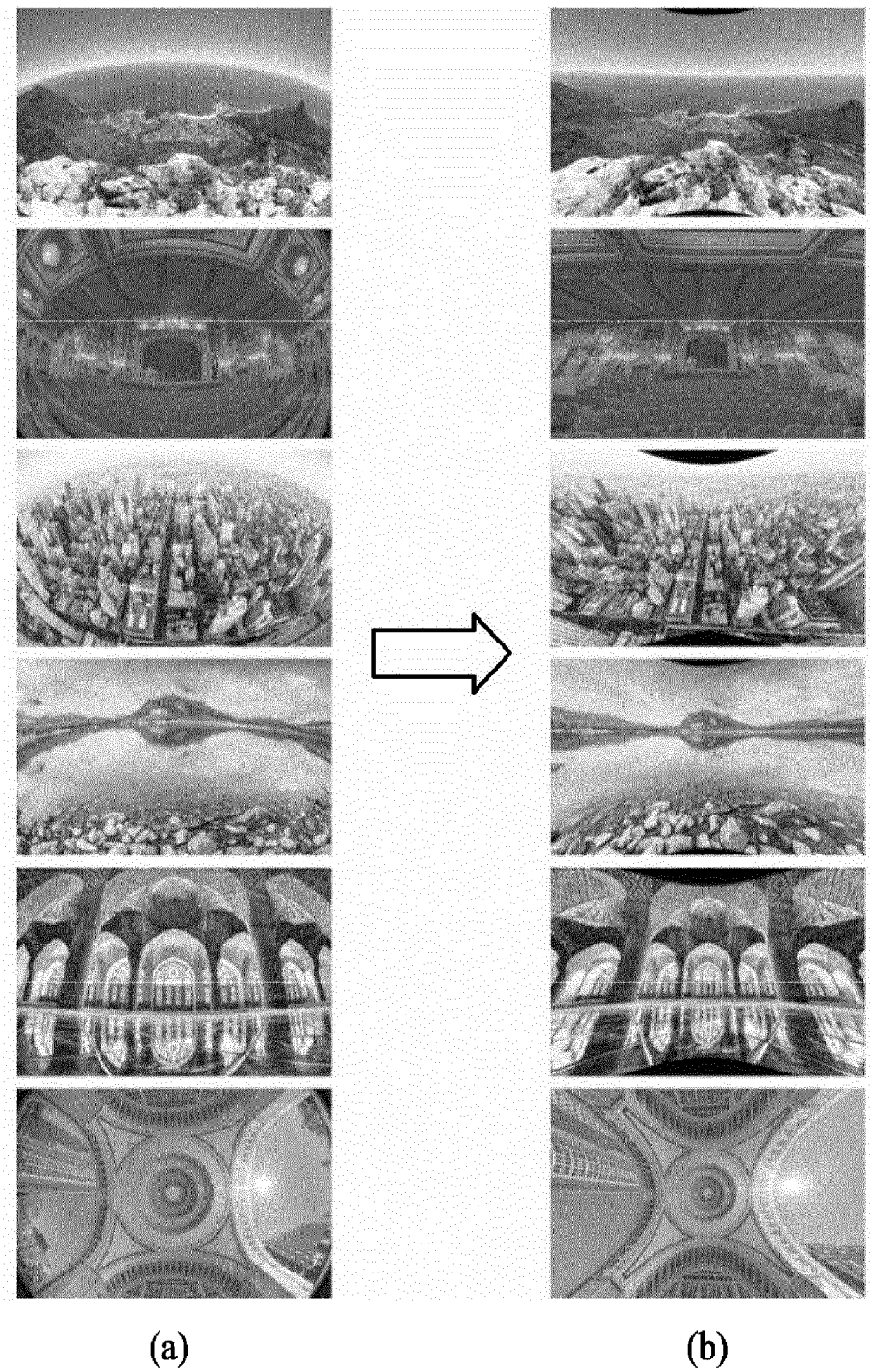
Figure 13:
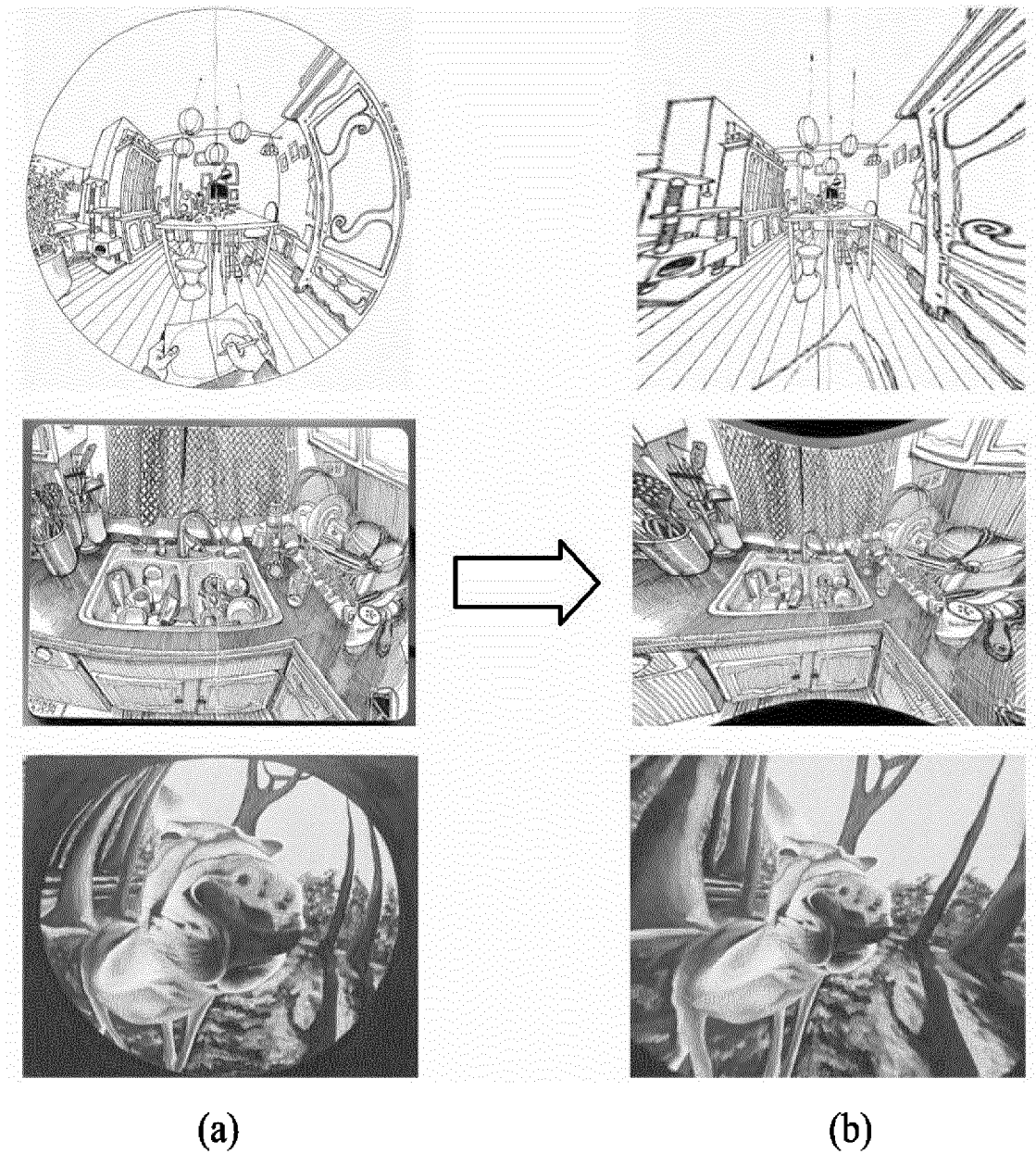

Images obtained by performing the camera calibration operation according to the present embodiment are shown in FIGS. 11 to 13.

In FIGS. 11 and 12, (a) shows original images and (b) shows images corrected according to the present embodiment. In addition, (a) in FIG. 13 shows an original image having a wide field of view and (b) in FIG. 13 shows an image corrected according to the present embodiment. Referring to FIG. 13, it can be seen that the camera calibration technique according to the present embodiment is applicable to not only actual photographs but also distorted images.

In addition, the present embodiment is applicable to not only calibration of a wide field of view camera but also calibration of a perspective camera which is not influenced by geometrical distortion.

In addition, according to the present embodiment, it is possible to perform robust camera calibration with respect to a motion blur phenomenon generated by increasing the exposure time of the camera in order to compensate for low lighting conditions (e.g., indoor environment, late night, etc.).

Although exemplary embodiments of the present disclosure have been described for illustrative purposes, those skilled in the art will appreciate that various modifications, additions and substitutions are possible, without departing from the spirit and scope of the claimed invention. Therefore, exemplary embodiments of the present disclosure have been described for the sake of brevity and clarity. Accordingly, one of ordinary skill would understand that the scope of the claimed invention is not to be limited by the embodiments explicitly described above but by the claims and equivalents thereto.

The embodiments of the present invention can be implemented by a variety of means, for example, hardware, firmware, software, or a combination of them. In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software codes may be stored in a memory unit so that it can be driven by a processor. The memory unit is located inside or outside of the processor, so that it can communicate with the aforementioned processor via a variety of well-known parts.

The invention claimed is:

1. A camera calibration method based on deep learning, comprising:
    acquiring an image captured by a camera; and
    predicting an intrinsic parameter of the camera by applying, to the acquired image, a neural network module trained to predict the intrinsic parameter;
    wherein the neural network module includes a first convolutional neural network (CNN) and a second CNN trained to predict different intrinsic parameters, and
    wherein the predicting of the intrinsic parameter includes:
        predicting a first intrinsic parameter of the camera by applying the first CNN to the acquired image;
        concatenating one or more feature maps composed of the first intrinsic parameter with any one of fully connected layers of the second CNN; and
        predicting a second intrinsic parameter of the camera by applying the second CNN to the acquired image.

2. The camera calibration method of claim 1, wherein the neural network module is trained using a plurality of learning images derived from a single panoramic planar image.

3. The camera calibration method of claim 2, wherein the plurality of learning images is generated by projecting the single panoramic planar image onto three-dimensional (3D) geometry to convert the single panoramic planar image into a 360-degree 3D image and changing an intrinsic parameter of a virtual camera set in the 360-degree 3D image.

4. The camera calibration method of claim 2, wherein the predicting of the intrinsic parameter includes predicting the intrinsic parameter of the camera by calculating a probability of a similarity between a ground truth parameter set in the neural network module and output data output from an output layer of the neural network module using a classification model.

5. A camera calibration apparatus based on deep learning, comprising:
    an acquisition unit configured to acquire an image captured by a camera; and
    a prediction unit configured to predict an intrinsic parameter of the camera by applying, to the acquired image, a neural network module trained to predict the intrinsic parameter;
    wherein the neural network module includes a first convolutional neural network (CNN) and a second CNN trained to predict different intrinsic parameters, and
    wherein the prediction unit includes:
        a first prediction unit configured to predict a first intrinsic parameter of the camera by applying the first CNN to the acquired image; and
        a second prediction unit configured to concatenate one or more feature maps composed of the first intrinsic parameter with any one of fully connected layers of the second CNN and to predict a second intrinsic parameter of the camera by applying the second CNN to the acquired image.

6. The camera calibration apparatus of claim 5, wherein the neural network module is trained using a plurality of learning images derived from a single panoramic planar image.

7. The camera calibration apparatus of claim 6, wherein the plurality of learning images is generated by projecting the single panoramic planar image onto three-dimensional (3D) geometry to convert the single panoramic planar image into a 360-degree 3D image and changing an intrinsic parameter of a virtual camera set in the 360-degree 3D image.

8. The camera calibration apparatus of claim 6, wherein the prediction unit predicts the intrinsic parameter of the camera by calculating a probability of a similarity between a ground truth parameter set in the neural network module and output data output from an output layer of the neural network module using a classification model.

* * * * *